July 29, 1969

W. LIMBERGER 3,458,255

APPARATUS FOR MANUFACTURING COPIES, AND MORE PARTICULARLY
EXPOSURE DEVICE

Filed April 19, 1966

United States Patent Office  3,458,255
Patented July 29, 1969

3,458,255
APPARATUS FOR MANUFACTURING COPIES, AND MORE PARTICULARLY EXPOSURE DEVICE
Walter Limberger, Hamburg-Poppenbuttel, Germany, assignor to Lumoprint Zindler KG, Hamburg, Germany
Filed Apr. 19, 1966, Ser. No. 543,643
Claims priority, application Germany, Apr. 23, 1965,
L 50,549
Int. Cl. G03b 27/70, 27/62
U.S. Cl. 355—66                         9 Claims

ABSTRACT OF THE DISCLOSURE

Apparatus for making copies of an original is formed of a housing having an upper surface containing a transparent exposure plate for supporting an original to be copied. Within the housing a light source, a mirror, and a lens are provided for transmitting an image of the original to copying material supported on a transparent guide surface in the housing. The upper surface of the housing has openings on two sides of the exposure plate and rotatable rollers positioned within the housing extend through the openings so that the rollers can transport an original across the exposure plate.

SUMMARY OF THE INVENTION

Figure 1:
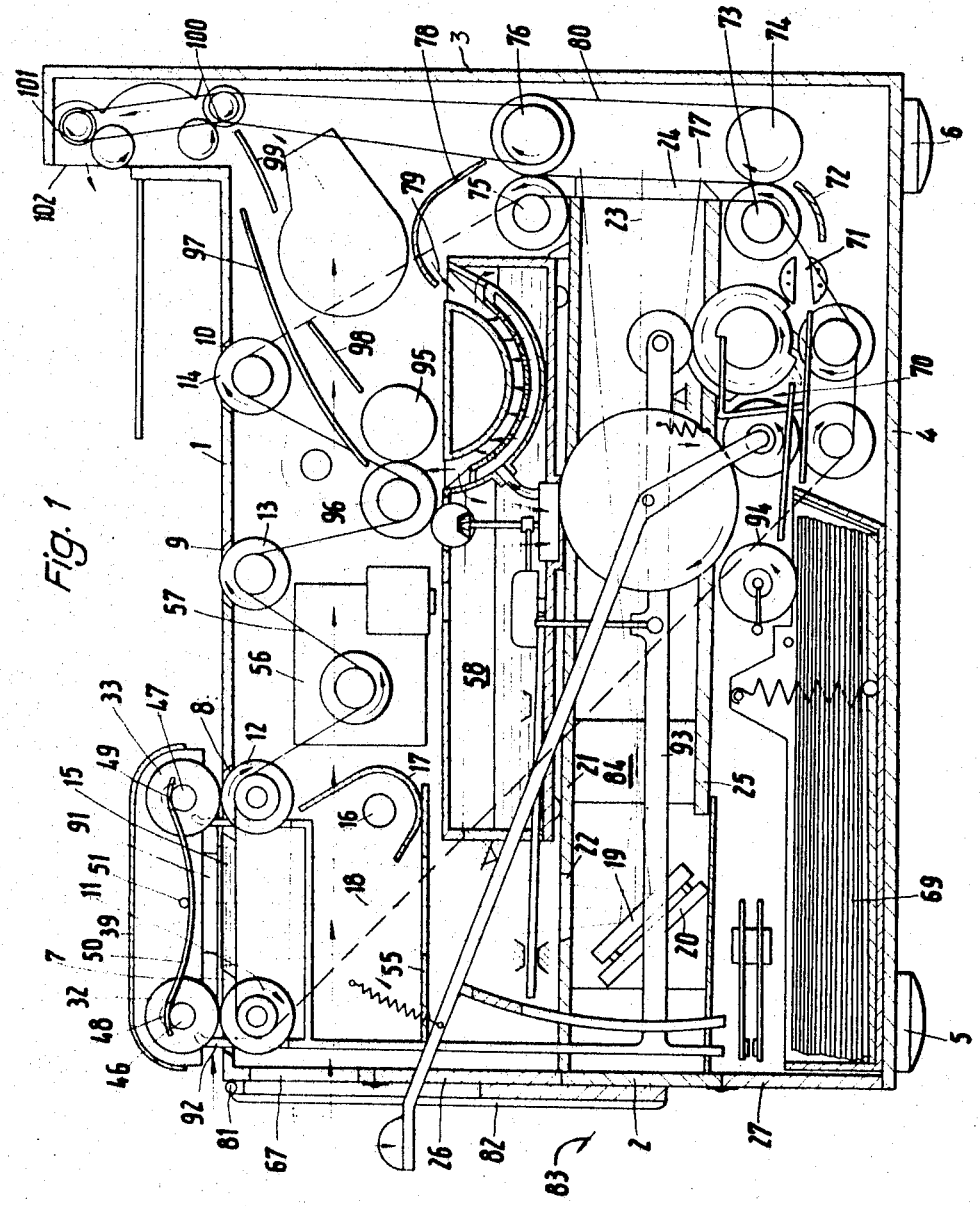

The invention relates to an apparatus for manufacturing copies, comprising an exposure device, a developing device, and a sheet feed, in conjunction with an apparatus control, wherein the exposure device comprises a transparent plate for the original in the upper wall of the housing and a transparent guide surface for the copying material to be exposed, and with at least one exposure light source, an objective and a deflecting mirror located between these two parts. The invention relates more particularly to a novel construction of the exposure device.

The present invention also comprises an automatic apparatus for manufacturing copies according to the electrophotographic method, without, however, being restricted thereto. The exposure device may also be used in apparatus using different methods, such as, for example, the silver salt diffusion method. It is only essential that the reproduction of the original on a sheet of copying material is produced by exposure and is subsequently rendered visible.

It is known according to the electro-photographic method to charge, expose and develop copying material, and more particularly sheets of such copying material, whereupon the applied developing particles, such as pigments, retained by electrostatic forces, are burned in to fix the picture.

It is one object of the invention to provide an automatic or automatically operating apparatus, embodying improvements in the exposure, with regard to the feed of the original.

It is a further object of the invention to provide an exposure device so constructed that it may be used, at choice, for thicker originals and sheet-like originals.

It is yet another object of the invention to provide an exposure device in the form of a continuous exposure device which is suitable also for supplying thicker originals without bending them.

It is a further object of the invention to provide an exposure device so constructed that the feed velocity is accurately dimensioned so that there occurs no displacement relative to the operating speed of a copying material within an apparatus housing.

According to the invention, guide rollers are provided within the zone of, and at least upstream and downstream of the transparent exposure plate, which project with a part of their periphery out of the top of the housing and are actively driven. This essential feature of the invention enables an original, either the page of a book or a sheet, to be passed by contact pressure with the guide rollers along a stationary exposure plate. It is an essential feature of the invention that, for making copies from books, provisions have been made for guiding a book movably past the exposure plate.

According to the invention, particularly for processing a sheet-like copying material, the guide rollers are associated with contact rollers, arranged above the guide rollers and held in resilient contact pressure thereagainst. According to an essential feature of the invention, the contact rollers are mounted in a housing-shaped frame, arranged detachably with the contact rollers on the apparatus housing. Their removal enables the processing of originals in the form of books, cards, and the like, having a greater thickness.

According to a further feature of the invention, the upper side of the housing has downstream and/or upstream of the guide rollers further openings through which protrude peripheral portions of driven guide rollers. This facilitates the production of copies from books which are guided over the exposure plate by contact pressure, for example by hand pressure, by means of the guide rollers. Preferably, the said exposure plate is arranged on a narrow edge of the upper surface of the housing, the beam to the guide face is L-shaped, and a feed table for the original is arranged foldably on the front edge of the housing and is equipped with friction reducing means, such as, ball guides, roller guides, fitted into the table, or longitudinal ribs.

The rotational speed of the guide rollers is matched to the velocity of a copying material inside the apparatus.

This construction of the exposure device provides the unique possibility of making copies from a book continuously during the movement thereof in that the book, for example under hand pressure, is guided along actively driven transport elements on the upper surface of a housing. This presents an essential feature of the invention.

In this connection it is of importance that stiff and bulky originals can be guided rectilinearly and without deflection, whilst the correct guide is assured by revolving transport means. Hitherto, copies from books were made along contact surfaces, whilst according to the invention, the continuous exposure may also be applied to producing copies from books.

Figure 2:
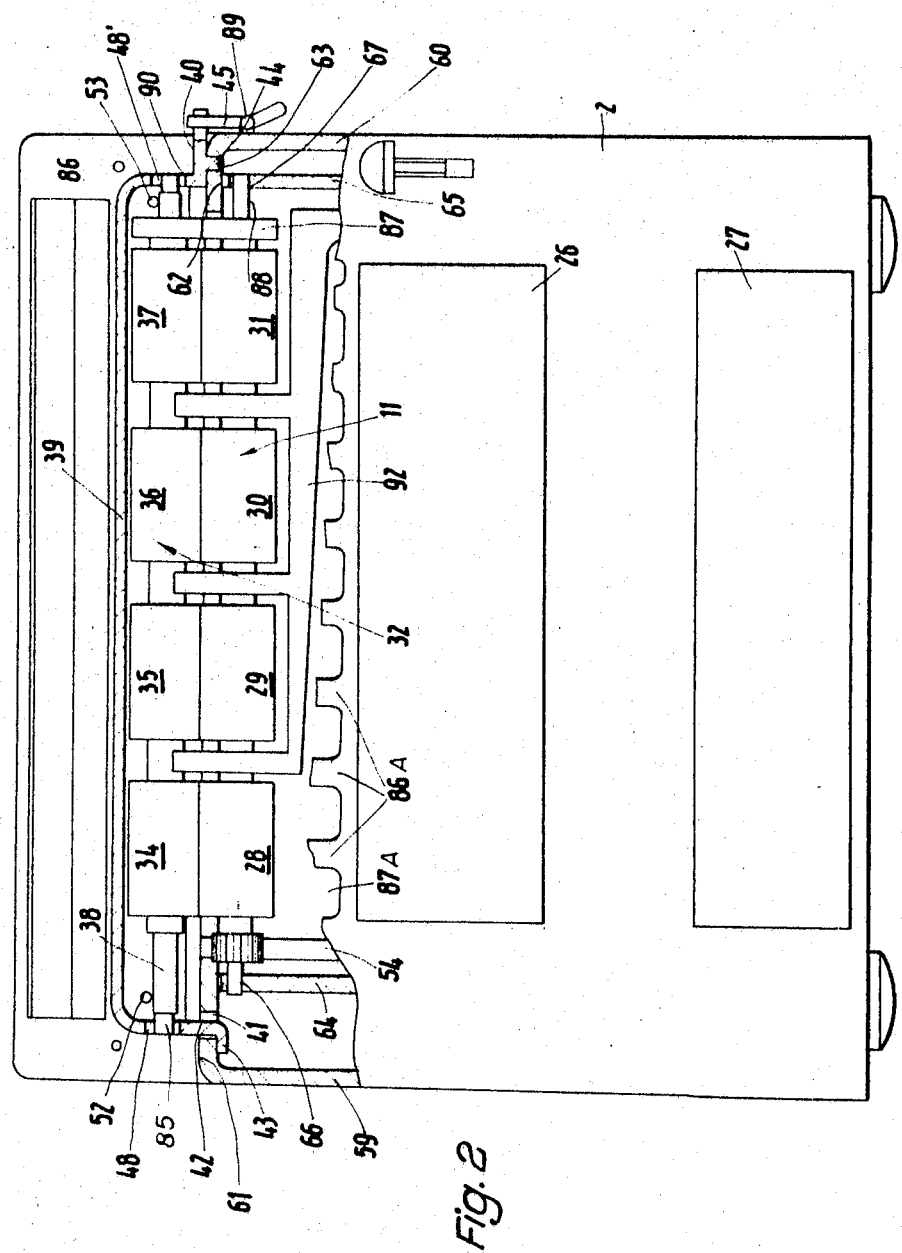

The invention will be further described, by way of example, with reference to the accompanying drawings, showing diagrammatically only the parts of the apparatus, necessary for the understanding of the invention. In the drawings:

FIG. 1 is a sectionalized side elevation of the apparatus according to the invention, the cross-section extending along different planes, and showing only the parts required for the ensuing description; and FIG. 2 is an end elevation of the apparatus shown broken away to demonstrate the parts of the exposure device.

The terms "rollers," "transport rollers" and the like, used in the following description, include also so-called disk rollers, comprising a plurality of disks arranged on the same shaft, wherein these disks may be expanded in some cases to form roller sections, and may be offset relative to adjacent rollers so as to form interengaging elements.

FIG. 1 shows the whole apparatus. It should be mentioned that the levers of the control device are arranged in another plane parallel to the plane of the drawing than, for example the spaces, along which the copying material is guided.

The apparatus according to the invention has a housing with an upper surface or wall 1, a narrow front wall 2, a rear wall 3, a base plate 4, which may be equipped with legs 5, 6. The side walls of the housing extends parallel to the plane of the drawing. The upper surface 1 has openings 7, 8, 9, 10, through which guide rollers 11, 12, 13, 14 in the housing protrude with a portion of their periphery beyond the surface 1 of the housing. These guide rollers are located in side or assembly walls of the housing, extending parallel to the plane of the drawing. They protrude above the upper surface 1 by an amount of 1 or 2 millimetres.

Between the holes 7, 8, and the guide rollers 11, 12 the upper surface is equipped with a transparent exposure plate 15, having a width at least equal to that of the copying material to be processed, and over which an original to be copied is guided.

The exposure plate is irradiated from below by at least one light source 16 arranged within the housing, for example by a tubular lamp, arranged in a reflector 17 which directs the radiation towards the exposure plate 15, but is located outside the picture beam, indicated by dash-dot lines 18. This beam impinges on a deflecting mirror 19, arranged, for example, on a three-point suspension on a plate 20 fixed in the housing. The beam passes via the mirror 19 through an intermediate partition 21, having an orifice 22; this orifice has a width corresponding to the picture beam. Behind the mirror 19, there is an objective lens 84.

The exposure beam has an L-shaped configuration and passes along a horizontal path 23 to a guide surface 24, which is also transparent in the same way as the exposure plate 15. The substantially vertically located guide surface 24 defines a channel with the upper wall 21 and the lower wall 25. These walls define between themselves the horizontal section of the L-shaped exposure beam towards the top and bottom between wall portions of the housing, extending parallel to the plane of the drawing and mounted on the housing walls.

The parts hitherto described, such as guide roller, guide face, light sources, reflectors, deflecting mirrors, plate 20, walls 21, 25 and the guide 24 are mounted in side walls extending parallel to the plane of the drawing. The guide 24 defines a section of the transport path for the copying material; this will be described to some extent further below, although it does not form part of the invention.

FIG. 2 shows an end-wise view of the housing, viewed in the direction of the end wall 2. As may be seen, two flaps 26, 27 are provided in the front wall of the housing; giving access to the inner parts. Moreover, the guide roller 11 is shown to consist of several roller sections 28, 29, 30, 31. The contact rollers 32, 33 (FIG. 1) arranged above the guide rollers 11, 12, consist, as shown in FIG. 2, of corresponding sections 34, 35, 36, 37, arranged on a common shaft 38; this shaft is mounted on a housing-shaped frame 39. The housing-shaped frame may be mounted, for example, on the upper surface 1 of the main housing, by means of a pivotable locking device 40. For example, the main housing may have a hole 41, through which a lateral edge 42 of the housing-shaped frame 39 may be inserted and anchored by means of an angle 43. The other side of the frame engages with a projection 44 into a recess in the upper surface and is additionally equipped with a locking device 45 for effecting the mounting by means of a pivotal movement on the top wall 1.

The locking device may co-operate, for example, with an abutment 89 of the housing side wall 60. The side wall portions of the housing-shaped frame, shown at 42 and 90, extend preferably over the entire length of this frame, assuring a reliable and tilt-proof closure. However, it is also sufficient to extend the side wall portions 42, 90 in their centre ranges towards the bottom, as shown in FIG. 1, where the projections are shown at 91. According to the side on which the projection is located, it carries either the angle 43 or the projection 44 with the pivoting closure 40, the locking lever of which is shown at 45 and co-operates with the abutment 89. These locking and engaging means are such that a longitudinal displacement along the upper housing wall 1 is impossible, even when the rollers 11, 32 and 12, 33 run on each other. The top cover of the housing-shaped frame 39 has also the advantage of preventing the operator from being dazzled by the exposure plate.

As shown in FIG. 1, the contact rollers 32, 33 are mounted with their spindles 46, 47 in oblong holes 48, 49 of the frame so as to be vertically movable, and are biased by at least one spring 50, passing with its centre under an abutment 51 and pressing with its ends against the top surfaces of the spindles 46, 47. The abutment 51 is mounted on the side walls of the frame 39. The front ends of the springs are shown in FIG. 2 at 52, 53, and the oblong holes at 48, 48'.

It may be seen that the oblong holes are provided in the vertical portions of the side walls of the housing frame 39, which is open towards the bottom. The bearing means may be specially equipped to prevent an axial displacement of the spindle 38. Thus, the spindle may have stepped ends, as at 85 in FIG. 2. In addition, the spindle 38 may have a gear wheel 86, engaging into a gear 87 mounted on the shaft 88 of the guide roller 11. In this way, a synchronous rotational drive of roller 11 and contact roller 32 is achieved. An equivalent construction may be provided for the rollers 12, 13.

FIG. 2 shows further the lower roller 11 with the sections 28 through 31, with a driving arrangement by means of a gearing 54, although a cable drive as shown in FIG. 1 may also be used. FIG. 2 presents therefore a modification. FIG. 1 shows that the cable drive 57 drives all rollers 11, 12, 13, 14 in the direction indicated by the arrows.

The upper zone of the housing forms a space above a shutter plane 55, shown only in part, with a motor 56 arranged thereabove, adapted to drive the revolving parts of the apparatus by means of the cable drive 57.

The housing construction of the apparatus is also shown in FIG. 2. In addition to the end walls 2, 3 in FIG. 1, the housing has side walls 59, 60, bent inwardly on the top as at 61, 62, to form the upper wall. The angled portions contain the hole 41 and the recess 63 for the projection 44, the hole and recess being slot-shaped and adapted in length to the frame 39.

within the side walls 59, 60, there are arranged, parallel thereto, so-called assembly walls 64, 65, containing the necessary bearings, such as, for example, bearing points 66, 67 for the stub axles of the guide roller 11. The figure also shows a part of the control device, the so-called grid 92, and an edge of an air inlet 87A with webs 86A passing therethrough.

The grid 92 serves as a locking device for the exposure device. It is shown generally as part of the apparatus control 70 and may be operated by a pivoting lever 93 for the apparatus control, which carries the grid 92. When this lever 93 is moved with its left end downwards, the exposure device is released in that the grid 92 is retracted downwardly into the apparatus.

The parts so far described, with the exception of the driving means, are mounted between and on the assembly walls 65, 64. Driving means may pass through these assembly walls so that linkages and parts of levers, as described below, are arranged in the spaces between the outer walls 59, 60 and the assembly walls 65, 64 (FIG. 2).

The lower part of the apparatus contains a supply 69 of copy material. Downstream of this supply 69 is a device, shown generally at 94, for removing and guiding the material in the rhythm of the operation of the apparatus. This device 94 is connected with the apparatus control 70, in which a charging device 71 may be located, if the apparatus is also to be used for electrophotographic copies. At the end of this unit is a guide face 72, curving towards the guide face 24. This transport section may comprise the pair of transport rollers 73, 74, driven, for example, by means of a cable 80, as shown in the drawing. This pair of transport rollers is at the bottom end of the guide face 24. A pair of transport rollers 75, 76 is arranged at the top end of this guide face and is driven in the sense indicated by the arrows. A guide element 77 may extend between the rollers 74, 76, and may be urged by spring pressure towards the guide surface. Several contact pressure strips 80 may extend above the rollers 74, 76, guiding the copying material under contact pressure along the surface 24.

Above the contact zone between the rollers 75, 76, there is another curved guide member 78, deflecting the arriving sheet of copy material to the inlet of a developing device 58, as indicated by the arrow 79.

From the outlet of the developing device 58, the transport path continues via rollers 95, 96, guides 97, 98, 99 further pairs of transport rollers 100, 101 to an outlet opening 102 in the housing.

It may be seen that the cable drive 57 operates not only the rollers 11 through 14 for the transport of the original, but also the transport means 73 through 76 and 80 which guide a sheet of copying material past the guide face 24; in this manner, a synchronized drive is guaranteed.

In front of the front wall 2 of the housing, a delivery table 82 is hinged along the upper edge of the wall at 81 so that it can be lifted in the direction of the arrow 83. This table, which may be equipped with friction reducing means (such as webs or bars extending in the direction of movement), facilitates the insertion and fitting of the original, such as a book, into the exposure device. In the zone in which the table 82, in its lowered position, is in front of the opening 67, it is equipped with orifices.

The invention may be applied to a novel automatic apparatus for producing copies, characterized by a novel support for the original. The apparatus may be adapted to be started by a manual lever with key operation which switches on the charging device, and releases after an appropriate time the movement of the original over the exposure plate, causing simultaneously a locking device formed by the grid 92 to be so controlled that a second operation of the key is impossible before the copy has passed through a part of its functional travel. Thus, several copies may be made in quick succession, i.e. a second copy can be started, before the material of the first copy has left the apparatus.

I claim:

1. An apparatus, for producing copies of an original, comprises a housing having an upper surface being arranged to support an original to be copied on the exterior of said housing, a transparent exposure plate being mounted in and forming a portion of the upper surface of said housing for supporting an original as it is being exposed for making a copy thereof, a transparent guide surface member being positioned within said housing and being arranged to support copy material for producing thereon a reproduction of the original located on said exposure plate, at least one light source being located within said housing between said exposure plate and said guide surface for illuminating the original on the exposure plate, objective lens means being positioned within said housing between said exposure plate and said guide surface for cooperating in transferring the image of the original to the transparent guide surface member, said upper surface of said housing having an opening along each of two opposed sides of said exposure plate, two guide rollers being arranged within said housing and each being aligned with one of the openings in the upper surface thereof and a portion of the peripheral surface of said rollers extending through the openings and being positioned above the upper surface of said housing, bearing means within said housing being arranged for rotatably supporting said rollers, drive means within said housing being operatively engaged for rotating said guide rollers, two contact rollers being located above the upper surface of said housing adjacent said exposure plate with each of said contact rollers being positioned above a different one of said guide rollers whereby a combination of one said guide roller and contact roller being disposed on each side of said exposure plate for receiving an original to be copied in the nip between said rollers for transporting the original across said exposure plate, and spring means arranged for resiliently urging each combination of said guide roller and contact roller together whereby originals of varying thicknesses can be accommodated therebetween for passage across said exposure plate, whereby as said guide rollers are rotated the peripheral surface thereof extending above said guide surface is arranged to contact an original positioned on said exposure plate for transporting the original across said exposure plate.

2. An apparatus, as set forth in claim 1, wherein transport means being positioned within said housing for transporting copying material from a storage position to said transparent guide surface member, and said transport means being operatively connected to said drive means for driving the said transport means as a function of the drive imparted to said guide rollers.

3. An apparatus, as set forth in claim 1, wherein a frame being supported on and above the upper surface of said housing and being positioned directly above said transparent exposure plate, bearing means being mounted in said frame, and said contact rollers being rotatably supported in said bearing means and the axis of each of said contact rollers being disposed in parallel relationship with and spaced above one of said guide rollers in said housing.

4. An apparatus, as set forth in claim 3, wherein said bearing means being supported within oblong holes in said frame with the oblong holes being disposed transversely to the direction of the said upper surface of said housing, and said contact rollers being movably supported within said oblong holes under the action of said spring means for displacing said contact rollers away from said exposure plate in the upper surface of said housing for accommodating originals of increased thickness dimension between said contact rollers and said guide rollers.

5. An apparatus, as set forth in claim 3, wherein means being secured to said frame for detachably mounting said frame on said housing.

6. An apparatus, as set forth in claim 1, wherein at least one other opening being formed in the upper surface of said housing and being spaced from the other openings therein in the direction of rotation of said guide rollers, another guide roller being rotatably mounted within said housing and arranged to extend outwardly through said another opening in the upper surface of said housing whereby said another guide roller being operatively connected with said drive means so that its peripheral surface extending through the upper surface of said housing contacts an original passing therealong and assists in the transporting of the original on the upper surface.

7. An apparatus, as set forth in claim 1, wherein said housing having a first end and a second end, said exposure plate being located adjacent one end of said housing, said transparent guide surface member being disposed adjacent the opposite end of said housing and extending in a plane substantially perpendicularly arranged to said exposure plate, a deflecting mirror being positioned within said housing and aligned below said exposure plate, said deflecting mirror being arranged in a plane obliquely disposed to said exposure plate and said guide surface member for reflecting an image of an original to be copied from said exposure plate to said guide surface member whereby the light beam provided by the said light travels in an L-shaped path from said exposure plate to said deflecting mirror and then to said guide surface member, and said lens being disposed intermediate said deflecting mirror and said guide surface member.

8. An apparatus, as set forth in claim 1, wherein said exposure plate being arranged adjacent one end of said housing and being supported on a narrow rim of said housing, hinge means being secured to said housing at the end thereof adjacent said exposure plate, a feed table member being pivotally secured to said hinge means and being adapted to be moved between a first position coplanar with the upper surface of said housing for supporting originals to be transported past said exposure plate and a second position being folded downwardly along a side surface of said housing.

9. An apparatus, as set forth in claim 1, wherein said drive means comprises a motor being mounted within said housing, and a cable drive being trained over said motor and said guide rollers and said transport means for rotating said guide rollers and transport means in synchronized operation for correlating the travel of the original past said exposure plate and the copying material past said transparent guide surface member.

References Cited

UNITED STATES PATENTS 2,509,072   5/1950   Pratt et al.

NORTON ANSHER, Primary Examiner

WAYNE A. SIVERTSON, Assistant Examiner

U.S. Cl. X.R.

355—76